Sept. 26, 1944.  O. F. RITZMANN  2,359,245
ELECTRICAL DISPLACEMENT VIBROMETER
Filed Jan. 19, 1943   2 Sheets-Sheet 1

INVENTOR.
O. F. Ritzmann
BY
ATTORNEY

Sept. 26, 1944.  O. F. RITZMANN  2,359,245
ELECTRICAL DISPLACEMENT VIBROMETER
Filed Jan. 19, 1943  2 Sheets-Sheet 2
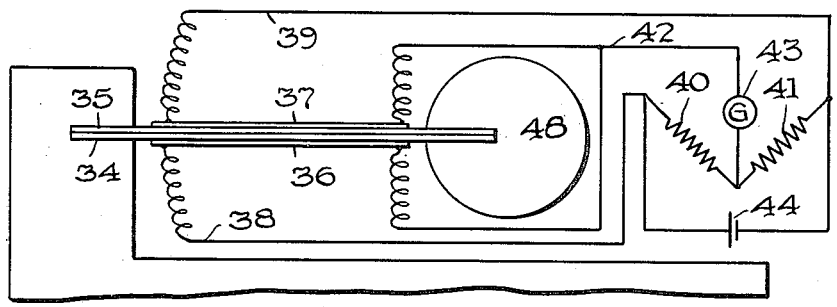
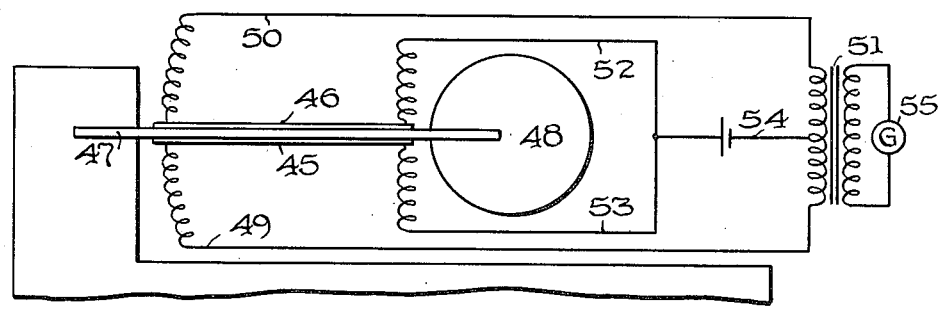
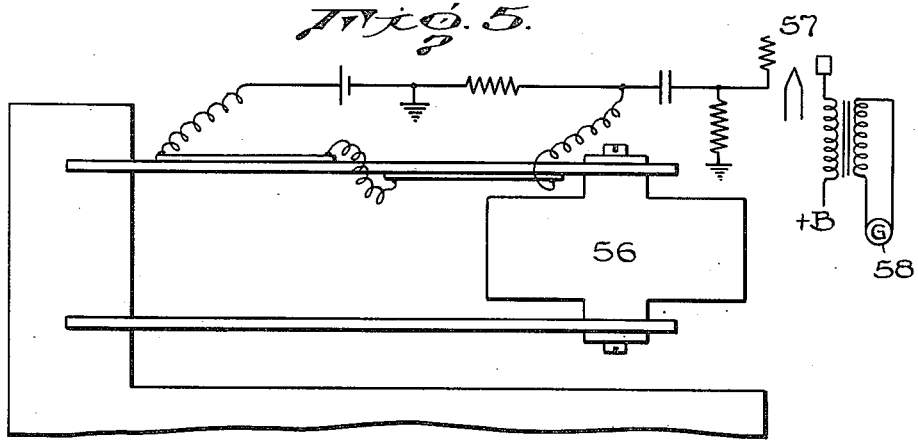
INVENTOR.
O. F. Ritzmann
BY
ATTORNEY Patented Sept. 26, 1944

2,359,245

UNITED STATES PATENT OFFICE 2,359,245

ELECTRICAL DISPLACEMENT VIBROMETER

Otto F. Ritzmann, Aspinwall, Pa., assignor to Gulf Research & Development Company, Pittsburgh, Pa., a corporation of Delaware Application January 19, 1943, Serial No. 472,895

3 Claims. (Cl. 177—352)

This invention relates to an electrical displacement vibrometer for exhibiting the effects of seismic disturbances, notably the magnitude of displacements resulting from earth shocks.

In the seismograph art a seismograph instrument consists of a relatively heavy mass elastically suspended so that the mass tends to remain at rest when its support vibrates with the ground underneath. If the free period of the mass is long compared to the period of the vibrations, then the displacement of the mass with respect to its support will be approximately the same as the displacement of the ground. The long period requires that the mass be delicately suspended. In the seismograph prospecting art the displacement is recorded electrically at some remote point as, for instance the recording truck. The electrical E. M. F. generated in previously known prospecting seismographs is proportional to the velocity of the displacement and not to the displacement itself. This is because the E. M. F. is obtained electromagnetically through a changing flux, and the E. M. F. is proportional to the rate of change of flux linkage. Unfortunately, other electrical means not dependent on the rate, such as the piezo effect of certain crystals, pressure of carbon discs, etc., are so stiff that they shorten the free period of the seismograph to the point where the mass displacement no longer even approximates the ground displacement. Therefore, none of these instruments are strictly displacement detectors.

More particularly the invention comprises a seismograph having a steady mass elastically suspended from a support to which earth shocks are transmitted, and an electrical resistance member so associated with the elastic suspension of the mass that, without materially affecting the delicacy of response thereof, the electrical resistance of such element varies as the mass is displaced. Thus, the magnitude of changes in an electrical current passing through the resistance member may be indicated and recorded as a function of earth displacement.

A primary object which is achieved by my invention is to provide an electrically recording seismograph instrument of the displacement type.

Another object is the provision of a flexible resistance, the value of which is varied by strains imposed upon the elastic suspension of a mass of high inertia, whereby vibrations causing displacement of the mass may be exhibited by the magnitude of current changes in a circuit which includes such resistance.

Another object of my invention is the provision of a seismic detector wherein the value of an electrical resistance is varied by displacement of a mass and through which resistance a current is passed to exhibit by its variations the displacements resulting from earth tremors.

A further object of the invention is to provide a seismograph wherein the elastic suspension of the steady mass includes a flexible resistance member, the value of which varies as the same is bent, whereby the varying magnitude of an electrical current therethrough is utilized to exhibit the magnitude of earth displacements.

Other and further objects will be apparent from the following description and drawings, in which Figure 1 is a vertical sectional view showing one embodiment of my invention wherein a cantilever spring is employed for suspending the steady mass.

Figure 3 is a diagrammatic view of a modification in which the elastic suspension for the mass constitutes the insulation base material of the resistance.

Figure 4 is a diagrammatic view showing an alternative electrical circuit for exhibiting variations in the flexible resistance strips.

Figure 5 is a diagrammatic view of a cantilever suspension similar to that shown in Figure 1 showing the electrical circuit for exhibiting displacements of the steady mass.

Figure 1:
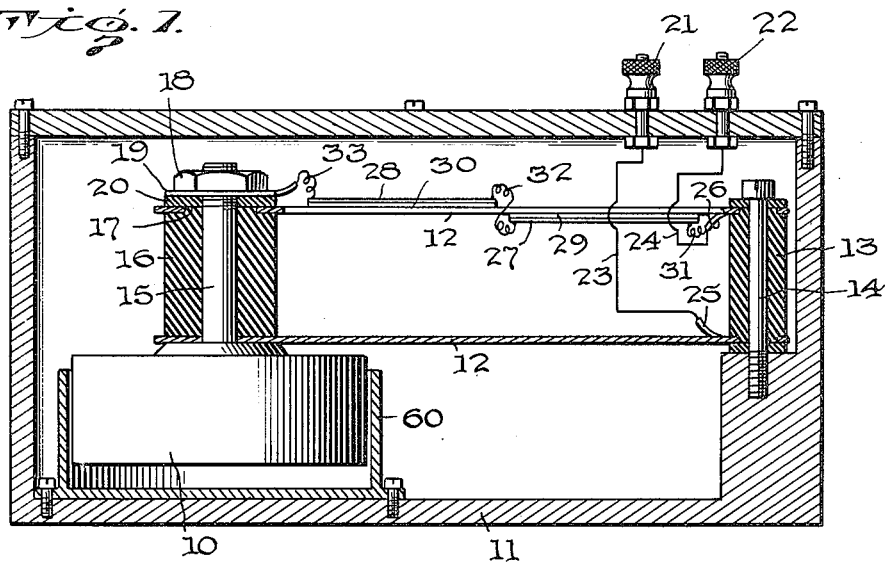
Figure 2:
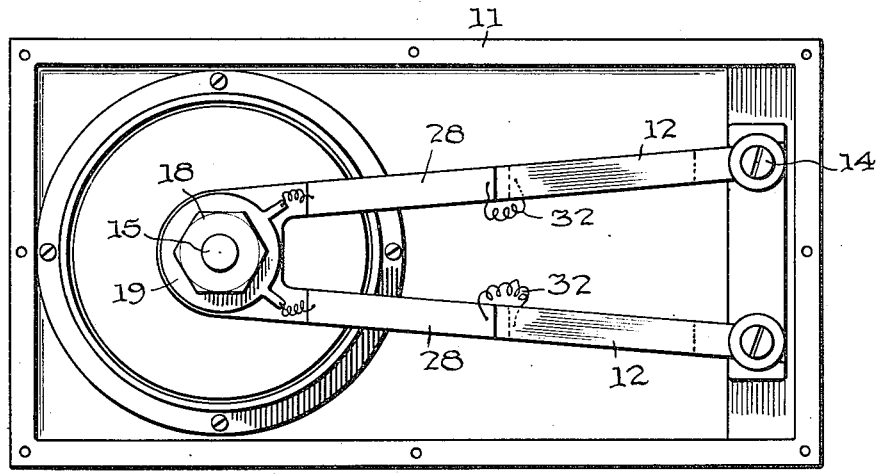
Figure 2 is a plan view of the instrument with the cover removed.

Referring more particularly to the drawings:

A mass 10 is suspended within a case 11 by a pair of spring arms 12 mounted in parallel relation and secured to a tubular insulating sleeve 13 mounted on a post 14 which is carried by the case. A stem 15 which extends upwardly from the mass 10 carries a tubular insulating sleeve 16 which has a reduced extension 17 projecting through an opening in the end of the upper spring arm 12 to prevent its contact with post 15. The nut 18 on the threaded end of post 15 secures a conductor clip 19 which is insulated from the upper spring arm 12 by an interposed insulating washer 20.

Binding posts 21 and 22 connect through wires 23 and 24 with terminal clips 25 and 26 in contact, respectively, with the lower and upper spring arms. As shown in Figure 1, the upper arm has mounted thereon a pair of resistance strips 27, 28 on insulating backing strips 29, 30, which are secured to opposite sides of the spring metal arm 12. In the form of invention shown, wherein the spring arms are metal, the resistance strips 27 and 28 with the insulating strips 29 and 30 may conveniently be cemented to the spring arm to make firm mechanical contact therewith. One end of the resistance strip 27 is connected to clip 26 by conductor 31, and to the resistance strip 28 at its other end by a conductor 32. The electrical path is completed by conductor 33 which connects the resistance 28 to clip 19. Current thereby passes from binding post 22 through wire 24, clip 26, conductor 31, through the resistance strip 27, then passes by way of conductors 32, resistance strip 28, conductor 33 and clip 19, through the stem 15 and returns through the lower spring arm 12 to the clip 25, and thence through wire 23 to binding post 21.

The use of resistances on opposite sides of the spring arm is of advantage where, as in Figures 1 and 5, a cantilever suspension is employed, for in such a construction the spring arms assume a compound curvature when bent, with the result that variations in the value of one resistance are added to the variations in the other resistance, whereas if a single resistance strip were used the variations in resistance caused by convexly bending one part of the strip would be offset by the increased conductance due to the concave bending and compression of the resistance surface at its other end.

Resistance elements may be applied to both suspensions, and also to all of both sides of the suspensions provided they are electrically discontinuous at the point of stress reversal and the various segments are electrically interconnected in the proper manner.

In the form shown in Figure 1, downward displacement of the mass results in compression of the resistances 27 and 28, whereas in the form shown in Figure 5, a downward displacement of the steady mass sets up tensional strains in the resistance members. In either case the magnitude of current changes may be indicated and is proportional to the magnitude of displacement of the mass.

In the modification illustrated in Figure 3, since the resistance constitutes the detecting element, the base material may be utilized as the elastic suspension. Any insulating material having suitable elastic properties may be employed for this purpose, preferably one having a low value of Young's modulus of elasticity, for example, Bakelite or other plastic. Two such strips 34 and 35 cemented back-to-back and carrying on their opposite, exposed sides resistance films 36 and 37 are connected at one end, respectively, by wires 38 and 39 to the arms 40 and 41 of a bridge circuit. The other ends of the resistances connect through a common conductor 42 and galvanometer 43 with the bridge. Current is supplied, by a battery 44 to complete the circuit, whereby upon displacement of the mass 48 the resistances will be unbalanced, one increasing under tension and the other decreasing under the compression. The galvanometer 43 thereby exhibits the algebraic sum of the resistance changes.

As shown in Figure 4 resistances 45 and 46 are mounted on a flat spring 47 which mounts a mass 48. Conductors 49 and 50 connect one end of each resistance strip through transformer 51, the other ends of resistances being connected through conductors 52 and 53 to the common line 54 which connects to an intermediate point in the transformer. The magnitude of current changes caused by simultaneous compression of strip 45 and tension of strip 46 is exhibited by a galvanometer or other indicating instrument 55.

In the further modification shown in Figure 5 both resistances are tensioned by downward displacement of the mass 56 and their values are added in exhibiting the magnitude of displacement of the mass. In this embodiment the fluctuating current passed by the resistances is amplified by an electronic tube 57, the plate of which connects with a transformer and the amplified fluctuating current is exhibited by a galvanometer or other indicating instrument 58.

In all forms of the invention vibration of the suspended mass may, if desired, be dampened as, for example, by positioning it in a closely encircling cup 60 (Figure 1) from which the entrance and escape of air are restricted. Other methods of damping well known in the seismograph art may be applied, such as electromagnetic and eddy current damping, viscous damping with oil, etc.

It is to be understood that the magnitude of current changes may be exhibited in any conventional way and, if desired, may be recorded, in a manner well known in the art to which this invention appertains. Furthermore, it is within the purview of this invention to employ a single resistance strip applied to the elastic suspension of a steady mass and serving by varying resistance of the strip under tension or compression, or by varying its conductance (the reciprocal of resistance), as by bending it to a convex or concave curvature.

The resistance strip which employs this invention consists essentially of a thin film of carbon, graphite, or metallic compound laid directly on an insulating base material which is itself non-conductive yet which is flexible. The resistance of the conductor varies depending upon the direction and degree in which it is bent.

It is to be understood that the structure details of mounting and suspending the mass are shown merely by way of illustration and are not to be understood as limiting the invention.

What I claim is:

1. An electrical displacement vibrometer comprising a mass, a cantilever spring suspension for said mass, a pair of flexible resistance members connected in series and mounted on said spring suspension to bend in displacement of said mass and to vary the resistance of both in a similar manner.

2. An electrical displacement vibrometer comprising a mass, a pair of leaf springs supporting said mass for displacement relative to a support, a pair of flexible resistance members connected in series and mounted on the opposite surfaces, respectively, of one of said leaf springs, and a circuit for exhibiting the algebraic sum of the resistances of said pair of resistance members as these vary in displacements of the said mass.

3. An electrical displacement vibrometer comprising a mass, flexible means for suspending said mass with respect to a support, flexible resistance members secured to said mass suspending means on opposite sides thereof, and a circuit for exhibiting the algebraic sum of the respective resistances as these are varied by displacements of said mass.

OTTO F. RITZMANN.